United States Patent Office 2,940,699
Patented June 14, 1960

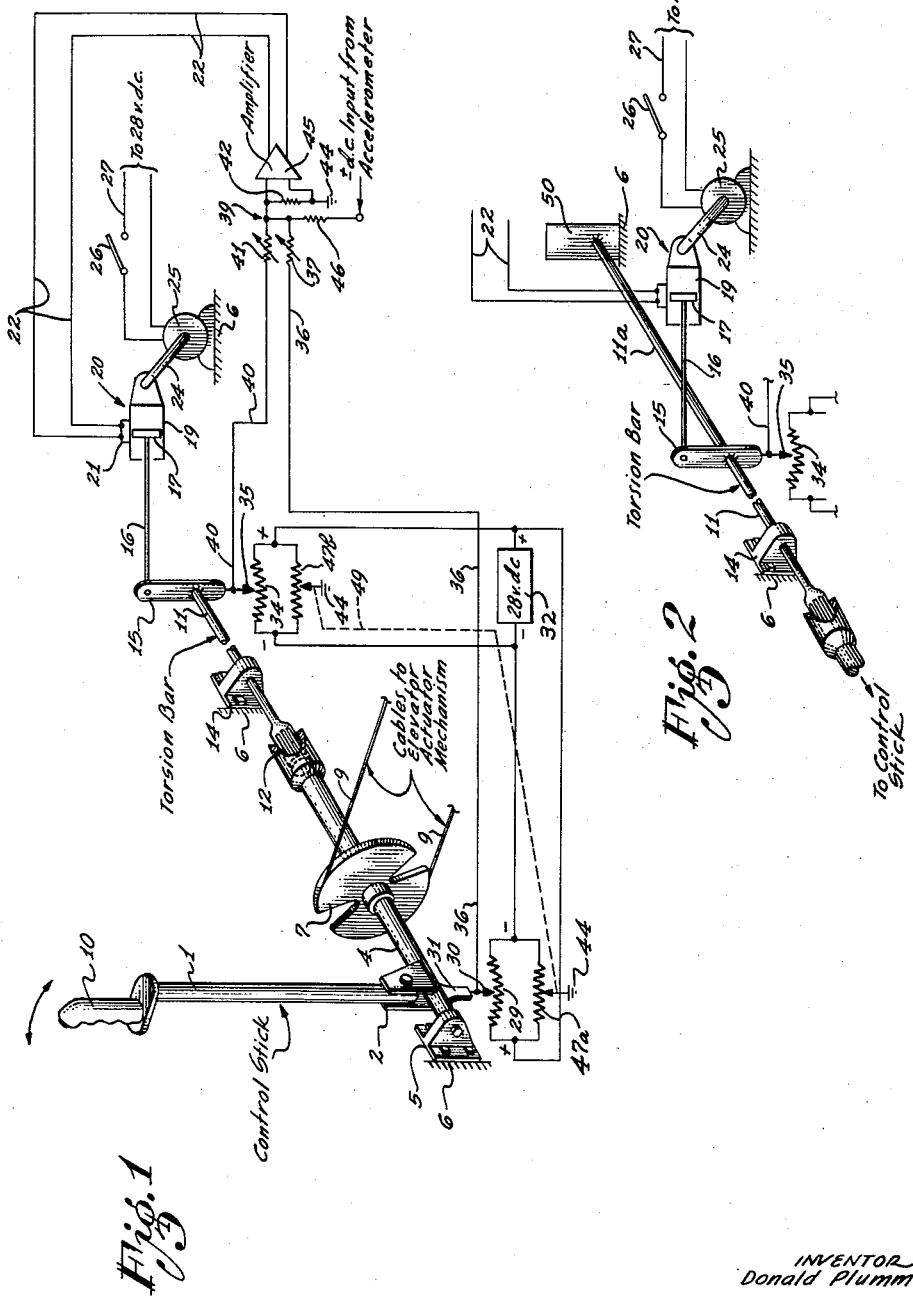

2,940,699
ARTIFICIAL FEEL FOR AIRPLANES

Donald Plummer, Manhattan Beach, Calif., assignor to Northrop Corporation, Hawthorne, Calif., a corporation of California Filed Jan. 11, 1957, Ser. No. 633,645

14 Claims. (Cl. 244—83)

The present invention relates to aircraft, and more particularly, to artificial force producers for providing desired control stick or column forces to the pilot, especially in airplanes using power operated attitude control surfaces.

Since larger and faster airplanes have led to the utilization of power systems for moving the control surfaces in accordance with the pilot-operated control elements, synthetic force producers have been developed which endeavor to provide force-feel flying in the best possible manner so as to simulate the normal air loads occurring on the surfaces and controls of a normal direct-connected airplane where the pilot manually and physically provided all the force to move the surfaces through the connecting linkages.

At first, these force producers merely attempted to provide an elastic restoring or centering force on the pilot's controls proportional to the distance of the surface or control away from neutral, and then came devices to increase the restoring force with higher airspeed. Next, other types gave a force proportional to normal acceleration, for example, and in the direction necessary to relieve or reduce this acceleration. Later, elements were added to accomplish trimming through the force producer mechanism. Still other proposals have been made to have the force producer also vary the motion ratio between the control element and the surface as desired, and others to increase the force with the rate of control element movement.

Special control force producers can be designed and built which will be suitable only for an airplane having some particular odd characteristic for which the special mechanism is to be designed, although a certain degree of adjustment is usually possible. However, in the case of mechanical linkages, springs, and the like, a universal system capable of fitting any airplane, both physically and functionally, is difficult or impossible to obtain.

It is an object of my invention to provide a new artificial feel system automatically giving a control stick centering force which is proportional to stick position, i.e., proportional to distance away from neutral in either direction. It is an object to include means also regulating this centering force in accordance with an airspeed or Q signal.

A further object of this invention is to provide a novel feel system giving a control stick force proportional to an external signal irrespective of stick position.

Another object is to provide, in an aircraft, a force producer feel system in accordance with either of the above-recited objects and additionally including a simple knob-operated means for accomplishing trim, i.e., changing the zero-force equilibrium position of a pilot-operated control element which the force mechanism operates upon.

It is still a further object of the present invention to provide fail-safe means for the force producer system which will allow safe operation of the control stick and as much of the surface control system as possible in the event of components or power failure.

Other objects and advantages will be noted in the detailed description of specific apparatus to follow, but it will be understood that the invention is not limited to the preferred embodiment disclosed herein, since this particular apparatus is shown for illustrative purposes only.

Briefly, my invention comprises an elastic means deflected at one end by the pilot's manual surface control member, and deflected at the other end by an actuator responsive to the sum of variously weighted signals produced by control member position, actuator position, and to other signal-producing or signal-adjusting means. By a "weighted" signal is meant a signal given a desired gain or attenuation before summing. Control member force is proportional to amount of deformation of the elastic means, which is of course dependent on the relative position of its ends. The normally stable end of the actuator is preferably connected to fixed structure through a clutch which can be disengaged to free the stick completely from any artificial feel force or to effectively connect it to a predetermined simple fixed-relation centering force means.

In general, the present actuator is electrically operated from an amplifier to which signals are fed from potentiometers driven by movement of each end of the elastic means. At the potentiometers, or between the potentiometers and the amplifier, the signals are operated upon as desired, or other signals added. Retrimming can be accomplished by adjusting resistances in parallel with the said potentiometers, which zeros the actuator signal at a different control member position. The elastic means is preferably a torsion bar.

In the accompanying drawings:

Figure 1 is a diagrammatic view of the present invention applied to the pitch controlling direction of an aircraft pilot's control stick, showing certain mechanical parts in perspective form as viewed from the left side of the stick, and showing electrical parts connected thereto in schematic form.

Figure 2 is a similar diagram of only a portion of the system, showing an alternate or additional fail-safe structure connected to the control stick torsion bar.

Referring to Figure 1 for a detailed description of a specific apparatus, a pilot's control stick 1 is mounted for lateral pivotal motion in a stick bracket 2. This lateral motion is used to operate a roll control mechanism (not shown). Stick bracket 2 is fixed to a lateral mounting shaft 4 which is rotatable in a shaft bracket 5 securely attached to aircraft structure 6. An elevator quadrant 7 carrying elevator cables 9 is attached to mounting shaft 4 so that fore-and-aft motion of a control stick handle 10 rotates the quadrant 7 and controls elevator actuating means (not shown) connected to the cables 9.

To the right-hand end, for example, of the mounting shaft 4 is connected a torsion bar 11, such as by a spline connection 12. Torsion bar 11 continues in line with the shaft 4 through a bar bracket 14, in which it is freely rotatable. Bar bracket 14 is also fixed to aircraft structure 6. Another shaft bracket, with bearing, could be installed near the quadrant 7 to hold the stick mounting assembly against bending mis-alignments in actual practice, but which is omitted for clarity of illustration. This stick mounting assembly thus permits lateral movement of the stick 1 for roll control, and longitudinal movement for pitch control, and could be replaced by any other equivalent conventional apparatus for the purposes of the present invention, having a torsion bar 11 connected functionally as described.

A lever 15 is fixed at its mid-point to the right-hand end of the torsion bar 11. A piston rod 16 is pivotally connected at a right angle to the upper end of the lever 15. The piston rod 16 is connected to a piston 17 within a cylinder 19 of an electrically-controlled hydraulic actuator 20. A transfer valve 21 with incoming electrical leads 22 controls the actuator in a well known manner, i.e., a signal of one polarity moves the piston 17 aft with respect to the cylinder 19, an opposite polarity signal moves it forward, and a zero signal puts the valve 21 in neutral and stops the actuator.

At the rear, the cylinder 19 is connected through a crank arm 24 to one face or element of a clutch 25, the other element being held solidly and attached to aircraft structure 6. The clutch 25 is electrically energized and engaged by a switch 26 in an electrical power line 27 connected to a power source of 28 volts D.C., for example. The clutch 25 is normally engaged during system operation, so that the cylinder 19 is prohibited from moving in a fore-and-aft direction.

As so far described, it is seen that, with the actuator piston 17 stationary, fore-and-aft motion of the control stick 1 is resisted by torsion bar 11, and the stick end of the torsion bar 11 would be twisted by such stick motion and reflect a restoring force on the stick 1 proportional to the angle of twist. Torsion bar 11 is preferably made of high grade steel, and of a suitable diameter and length to allow a twist of about 30 degrees, or as required, while giving a predetermined force gradient.

A stick potentiometer 29 is suitably mounted so that its movable tap 30 is driven by fore-and-aft stick motion through a driver 31 fixed to the mounting shaft 4 and extending downwardly therefrom. This potentiometer 29 is connected across a constant voltage source 32, such as 28-volt D.C., with the forward end of the potentiometer connected to the positive terminal. It will be noted that in this system as presented, neither side of this voltage source 32 can be grounded to a zero-volt reference point. A lever potentiometer 34 is similarly incorporated near the right end of the torsion bar 11, with its movable tap 35 connected to be driven by the lower end of the lever 15, and with the forward end of the lever potentiometer 34 connected to the negative terminal of the voltage source 32.

From the stick potentiometer tap 30, a first output lead 36 is connected through a first variable resistor 37 to a summing point 39, and from the lever potentiometer tap 35, a second output lead 40 is connected through a second variable resistance 41 to the summing point 39. A load resistance 42 is connected from summing point 39 to ground 44, and the input of a summing amplifier 45 is connected across this latter resistance 42. Output from amplifier 45 is connected to the electrical leads 22 which feed to the transfer valve 21 of the actuator 20. A further connection is made to summing point 39 via an input resistance 46, for purposes to be described later.

Trimming potentiometers 47a and 47b are connected respectively in parallel with the stick potentiometer 29 and the lever potentiometer 34. The movable tap of each is grounded and they can be ganged together by a common trim control shaft indicated by broken line 49. The control of this shaft is located convenient to the pilot for trimming purposes which will be discussed later. However, it is noted here that in certain variations, it will not be necessary to install a common shaft 49 to operate both trim potentiometer 47a and 47b simultaneously; either trim pot 47a or 47b can suffice, alone.

In explaining how this feel system operates, first assume that all the potentiometers are centered and are of equal resistance value, the actuator piston 17 is centered in the cylinder 19, the clutch 25 is engaged, and resistance 37 equals resistance 41. This is not necessarily an actual operating set-up, but is used merely as a starting point for descriptive purposes. Thus, everything is stationary, and there is zero input to, and zero output from the amplifier 45.

If the control stick 1 is now moved aft, for example, stick potentiometer tap 30 will move to a positive potential point and result in a positive signal voltage on first output lead 36, thus producing a positive signal at the summing point 39. This positive signal is amplified in amplifier 45 and sent to the actuator 20 in the proper sense to retract the piston rod 16 back into the cylinder 19 and thus move the upper end of lever 15 aft. This, of course, immediately turns the torsion bar 11 in the same direction as done by the stick at the other end, and also moves the lever potentiometer tap 35 forward to a negative potential. Now a negative voltage signal thus appears on second output lead 40, and it will become equal to the positive signal on first output lead 36, cancelling out to zero the voltage at the summing point 39, and stopping the actuator motion at a position corresponding to the new position of the control stick 1. Therefore, what will have happened is that the stick remains in the new position by itself with no applied force, since the torsion bar 11 is not twisted at all, both ends have turned through the same angle. This explains the mechanics of operation of the various system components.

To provide a restoring force at the control stick 1 which is proportional to its distance away from a given centered position, second variable resistance 41 can be decreased or first resistance 37 increased, for example, thus allowing a certain angular rotation of lever 15 to effect the same voltage change at the summing point 39 as a greater angular rotation of the stick 1. In reality, the gain of the signal on second output lead 40 has been increased over that of the first output lead signal, in its effect at the input to the amplifier 45.

It can be seen that now (with resistances 37 and 41 unequal) a given angular stick movement from center will result in a smaller "follow-up" movement of lever 15 before a zero input signal is re-established at the summing point 39, thereby leaving a certain twist in the torsion bar 11 tending to force the stick 1 back toward center. The farther the stick is moved away from neutral, the greater will be this restoring force, since every increment of torsion bar rotation at the stick end is followed by a smaller increment of rotation at the other end. The same occurs on the other side of neutral, with the resulting twist force being in the opposite direction of course. Therefore, the feel system produces a stick centering force proportional to stick distance away from neutral. By making the signal gains more unequal, the stick force gradient in pounds per inch is increased. The arrangement just described is one preferred operating configuration of the present invention.

Another way of providing a stick force proportional to stick position is to reverse the polarity of voltage to one, only, of the potentiometers 29 or 34, thus causing the actuator 20 to twist the torsion bar 11 at one end opposite to the direction twisted at the other end by the control stick 1. Of course the bar is twisted through a much larger angle per degree of stick motion, with the latter method, and the appropriate force relationships must necessarily be taken in account when designing the torsion bar.

Still other ways of accomplishing the same effect of producing a stick force varying in accordance with position are to: "gear" the potentiometer taps 30 and 35 to the torsion bar 11 unequally, or make electrically tapered resistance elements 29 and 34 of different characteristics, or provide two separate and different voltage sources across potentiometers 29 and 34 individually, or use various other equivalent means known in the electrical art for causing signal variation in accordance with desired response.

If a signal of negative polarity is fed in externally through input resistance 46, the actuator piston 17 will be forced to extend forwardly from the cylinder 19 and rotate the lever 15 in the stick-forward direction until an opposite positive signal produced on second output lead 40 reduces the amplifier input signal to zero again at the summing point 39. This naturally produces a forward stick force which will be felt by the pilot no matter at what position the control stick 1 is. As long as the external signal remains, a proportional stick force results.

Therefore, an accelerometer, for example, can be positioned to give an electrical signal output varying in accordance with acceleration of the airplane in a direction normal to its longitudinal reference line, and this signal fed in through input resistance 46 to provide a stick force tending to move the stick in the direction to reduce the normal acceleration. This is equivalent to a bob weight acting by inertia on the control stick forward of the pivot to aid in preventing excessive load factors from being imposed on the airplane. Obviously, any other desired signal from an external component or system can likewise be introduced to provide a stick force irrespective of stick position.

If a different neutral stick position is wanted at any time, the trim potentiometer shaft 49 is merely turned the desired amount in the proper direction, thus repositioning trim potentiometers 47a and 47b so that a signal is fed through the amplifier 45 to require adjustment of the lever 15. This trimming operation is possible only in the case of unequal gains from output leads 36 and 40, although it is easily seen that in many cases, as mentioned previously, only one trim pot is necessary. When using only one, the other is either omitted entirely or has a fixed point grounded.

Safety provisions are made so that in case of malfunction of any nature, the system can be more or less disconnected to allow control movements of the stick 1 even if not having the usual optimum force characteristics. As shown in Figure 1, the clutch switch 26 can be manually opened by the pilot if some part of the signal system fails in such a way as to lock the actuator 20, for example, or to drive it hard over in one direction. The control stick 1 will then have no resistance to movement whatever, since the clutch 25 is disengaged and the torsion bar 11 will merely follow the stick motion with no reaction. In case of an electrical power failure, the same result is accomplished automatically because the clutch 25 will disengage when the power to it fails.

The safety system could be modified as shown in Figure 2, with slightly different and improved results. Here, the torsion bar 11 continues beyond the lever 15 as bar portion 11a and is rigidly connected at the far end to a fixed plate 50 in the airplane. Bar portion 11a is normally controlled wholly by the actuator 20 during normal system operation, and its twisting stress does not, therefore, affect stick force in any way. Supposing a failure as discussed in the preceeding paragraph, however, when the clutch 25 disengages, then the bar portion 11a acts in series with the first length of torsion bar 11 between the movable stick end and the fixed plate end. Thus, the actuator 20 is again effectively removed from the feel system and the torsion bars 11 and 11a provide a minimum nominal stick centering force very useful in flying the airplane under such an emergency condition.

It is thus seen that a positive, versatile, completely safe, and relatively simple force producer is provided by this invention. By merely changing voltages and resistors, it will produce effects at the control stick or column simulating control surface position, bob weight (accelerometer), and trim motor, or other external voltage signals fed into the amplifier. The piston-and-cylinder type of actuator can be replaced by a heavy duty electric servomotor, since this feel system is actually a servo system where servomechanism techniques are used.

Various modifications can obviously be made in the system. For instance, the torsion bar 11 can be replaced by another type of elastic means, such as a two-way centering spring assembly working in a linear rather than a torsional direction, for example. Further, the connection of the force producing element to the control stick 1 can be made anywhere in the stick linkage to the surface actuating motor or mechanism. The surface control cables 9, or other motion transmitting means if used, are directly connected to the control stick 1 at all times and are independent of the force producer connection. While the present invention has been described as applied to elevators or other pitch controlling surfaces of an aircraft, the scope of the invention is not to be limited thereto, since it is obviously applicable to other surfaces and to other uses for force producers.

While in order to comply with the statute, the invention has been described in language more or less specific as to structural features, it is to be understood that the invention is not limited to the specific features shown, but that the means and construction herein disclosed comprise a preferred form of several modes of putting the invention into effect, and the invention is therefore claimed in any of its forms or modifications within the leigtimate and valid scope of the appended claims.

What is claimed is:

1. An artificial feel system for an aircraft, comprising: a pilot's control element, control surface actuating means movable in substantially rigid accordance with said element to deflect a control surface, double-acting elastic means connected at one end to said control element, said one end being rigidly movable with said surface actuating means, said elastic means having a centered position at which no elastic force occurs, an actuator having a movable output member, driving means connected from said output member to the other end of said elastic means, first signal producing means dependent solely upon control element position, second signal producing means dependent solely upon output member position and independent of said first signal producing means, and signal summing and handling means connected to both said signal producing means, the output of said summing and handling means connected to the input of said actuator, the direction of actuator output being such as to bring to zero the input to said summing and handling means.

2. Apparatus in accordance with claim 1 wherein said elastic means is a torsion bar.

3. Apparatus in accordance with claim 1 including gain control means for increasing the gain of the signal from said seond signal producing means over that of the signal from said first signal producing means, whereby said elastic means has a different deformation at different control element positions.

4. Apparatus in accordance with claim 1 including gain control means for decreasing the gain of the signal from said first signal producing means below that of the signal from said second signal producing means, whereby said elastic means has a different deformation at different control element positions.

5. Apparatus in accordance with claim 1 including external signal input means connected to said signal summing and handling means, whereby the position of said actuator output member, and hence the force on said control element, is controllable by an external signal in a manner independent of the position of said control element.

6. Apparatus in accordance with claim 1 wherein said actuator has a normally stable housing member with respect to which said movable output member is actuated, and wherein said housing member is rigidly connected to fixed aircraft structure, at least in the directional line of output member motion.

7. Apparatus in accordance with claim 1 wherein said actuator has a normally stable housing member with respect to which said movable output member is actuated, and including clutch means connected between said housing member and fixed aircraft structure, said clutch means being normally solidly engaged during operation of said feel system, and means for releasing said clutch to prevent actuator movement from causing a load on said elastic means.

8. Apparatus in accordance with claim 1 including trimming control means connected to at least one of said signal producing means with a manual control therefor to change the position of said control element relative to said centered position of said elastic means.

9. In an aircraft having a pilot's control element movable to control the attitude of the aircraft, synthetic force control means comprising: control surface actuating means movable in substantially rigid accordance with said element to deflect a control surface, a torsion bar, means connecting one end of said torsion bar to said control element to be twisted by rotation of said control element, an actuator having a movable output member connected in rotational driving relation to the other end of said torsion bar, a first fixed potentiometer having its movable tap operatively connected to said control element, a second fixed potentiometer having its movable tap operatively connected to said torsion bar other end, means for impressing a voltage across each of said potentiometers, electrical means connecting each of said potentiometer taps to a common signal summing point, and actuator control signal output means connected from said summing point to said actuator, the direction of actuator output being such as to cancel the input control signal on said summing point at a desired position of said actuator.

10. Apparatus in accordance with claim 9 including gain changing means whereby a small movement of said torsion bar other end has the same signal effect at said summing point as a larger movement of the control stick end of said torsion bar.

11. In an aircraft control system having a pilot's control element movable to control the attitude of the aircraft, synthetic force producing means comprising: a torsion bar, means connecting one end of said torsion bar to said control element to be twisted by rotation of said control element, an actuator having a movable output member connected in rotational driving relation to the other end of said torsion bar, a first fixed potentiometer having its movable tap operatively connected to said control element, a second fixed potentiometer having its movable tap operatively connected to said torsion bar other end, means for impressing a voltage across each of said potentiometers, electrical means connecting each of said potentiometer taps to a common signal summing point, actuator control signal output means connected from said summing point to said actuator, the direction of actuator output being such as to cancel the input control signal on said summing point at a desired position of said actuator, and a third potentiometer connected in parallel with one of said first two potentiometers, the movable tap of said third potentiometer being electrically connected to a fixed potential point between the relatively positive and negative sides of said voltage, for use as an adjustable trimming element.

12. Apparatus in accordance with claim 9 including an external electrical input element connected at one end to said summing point, whereby control element force can be regulated in accordance wtih an external signal irrespective of control element position.

13. Apparatus in accordance with claim 9 wherein said actuator has a normally stable housing member with respect to which said movable output member is actuated, and including electrically operated clutch means connected between said housing member and fixed aircraft structure, said clutch means being normally electrically energized and solidly engaged during operation of said force producing means, and manually operable switch means for de-energizing and releasing said clutch means to prevent actuator movement from causing a load on said torsion bar.

14. In an aircraft control system having a pilot's control element movable to control the attitude of the aircraft, synthetic force producing means comprising: a torsion bar, means connecting one end of said torsion bar to said control element to be twisted by rotation of said control element, an actuator having a movable output member connected in rotational driving relation to the other end of said torsion bar, a first fixed potentiometer having its movable tap operatively connected to said control element, a second fixed potentiometer having its movable tap operatively connected to said torsion bar other end, means for impressing a voltage across each of said potentiometers, electrical means connecting each of said potentiometer taps to a common signal summing point, actuator control signal output means connected from said summing point to said actuator, the direction of actuator output being such as to cancel the input control signal on said summing point at a desired position of said actuator, said actuator having a normally stable housing member with respect to which said movable output member is actuated, and including clutch means connected between said housing member and fixed aircraft structure, an additional torsion bar portion connected in line with said torsion bar and extending from said other end of said torsion bar where said actuator output member is drivingly connected thereto to a point where said additional torsion bar portion is rigidly secured to fixed aircraft structure, said clutch means being normally solidly engaged during aircraft flight, and means for releasing said clutch means to prevent actuator movement from causing a load on said torsion bar and bar portion, whereby an emergency safety stick centering force is available.

References Cited in the file of this patent
UNITED STATES PATENTS

| | | |
|---|---|---|
| 2,451,263 | Webb | Oct. 12, 1948 |
| 2,604,613 | Klass | July 22, 1952 |

FOREIGN PATENTS

| | | |
|---|---|---|
| 142,431 | Australia | July 24, 1951 |